(12) United States Patent  (10) Patent No.: US 8,103,686 B2
Gollapudi et al.  (45) Date of Patent: Jan. 24, 2012

(54) EXTRACTING SIMILAR ENTITIES FROM LISTS/TABLES

(75) Inventors: Sreenivas Gollapudi, Cupertino, CA (US); Alan Halverson, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 11/954,218

(22) Filed: Dec. 12, 2007

(65) Prior Publication Data

US 2009/0157644 A1 Jun. 18, 2009

(51) Int. Cl.
*G06F 17/30* (2006.01)

(52) U.S. Cl. .................. 707/758; 707/E17.014

(58) Field of Classification Search .............. 707/3–5, 707/706, 713, E17.014, 999.005, 758
See application file for complete search history.

(56) References Cited

U.S. PATENT DOCUMENTS

| | | | | |
|---|---|---|---|---|
| 5,675,819 A * | 10/1997 | Schuetze | .................. | 704/10 |
| 5,873,082 A | 2/1999 | Noguchi | | |
| 5,909,677 A * | 6/1999 | Broder et al. | .................. | 707/3 |
| 6,240,409 B1 * | 5/2001 | Aiken | .................. | 707/4 |
| 6,338,060 B1 | 1/2002 | Washizawa | | |
| 6,374,209 B1 * | 4/2002 | Yoshimi et al. | .................. | 704/9 |
| 6,446,068 B1 * | 9/2002 | Kortge | .................. | 707/6 |
| 6,493,709 B1 | 12/2002 | Aiken | | |
| 6,996,572 B1 | 2/2006 | Chakrabarti et al. | | |
| 7,139,756 B2 | 11/2006 | Cooper et al. | | |
| 7,398,200 B2 * | 7/2008 | Ie et al. | .................. | 704/9 |
| 2004/0107189 A1 | 6/2004 | Burdick et al. | | |
| 2004/0107205 A1 | 6/2004 | Burdick et al. | | |
| 2004/0117357 A1 | 6/2004 | Schirmer et al. | | |
| 2006/0122978 A1 | 6/2006 | Brill et al. | | |
| 2007/0005589 A1 | 1/2007 | Gollapudi | | |
| 2007/0083511 A1 | 4/2007 | Kapoor et al. | | |
| 2008/0256143 A1 * | 10/2008 | Reddy et al. | .................. | 707/204 |

OTHER PUBLICATIONS

"Similarity Functions", http://www.hcrc.ed.ac.uk/ilex/ilex3/Programmers/ProgGuide/node8.html.
Liu, et al., "Measuring Semantic Similarity between Named Entities by Searching the Web Directory", pp. 1-5.

* cited by examiner

*Primary Examiner* — Tim T Vo
*Assistant Examiner* — Shiow-Jy Fan (57) ABSTRACT

Large numbers of lists of entities may be mined for similar entities to related searches. A representation for each list may be determined to provide for a comparison between lists and to support membership checks. A score for an element in a list may be computed that represents the validity of an item in the corpus of lists. Thus, a spurious element would receive a very low score, where a valid element would receive a higher score. A list weight is then computed using the constituent element weights, and the element and list weight are used to compute the nearest neighbors of a given query element.

20 Claims, 5 Drawing Sheets

EXTRACTING SIMILAR ENTITIES FROM LISTS/TABLES

BACKGROUND

A term frequency-inverse document frequency (TF-IDF) weight may be used in information retrieval and text mining. This weight is a statistical measure used to evaluate how important a word is to a document in a collection or corpus. The importance increases proportionally to the number of times a word appears in the document, but is offset by the frequency of the word in the corpus. Variations of the TF-IDF weighting scheme are often used by search engines as a central tool in scoring and ranking a document's relevance given a user query. Lists of entities contain information grouped according to some criterion. As such, lists are a good source of information to determine relevant information responsive to a query. However, entities may occur in different lists and may be associated with different members in each list. In addition, there are a large number of lists on the web and assigning weights to such a large number of lists creates hurdles in mining such lists for information.

SUMMARY

Lists of entities may be mined for similar entities to related searches. A representation for each list may be determined to provide for a comparison between lists and to support membership checks. A score for an element in a list may be computed that represents the validity of an item in the corpus of lists. Thus, a spurious element would receive a very low score, where a valid element would receive a higher score. A list weight is then computed using the constituent element weights, and the element and list weight are used to compute the nearest neighbors of a given query element.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
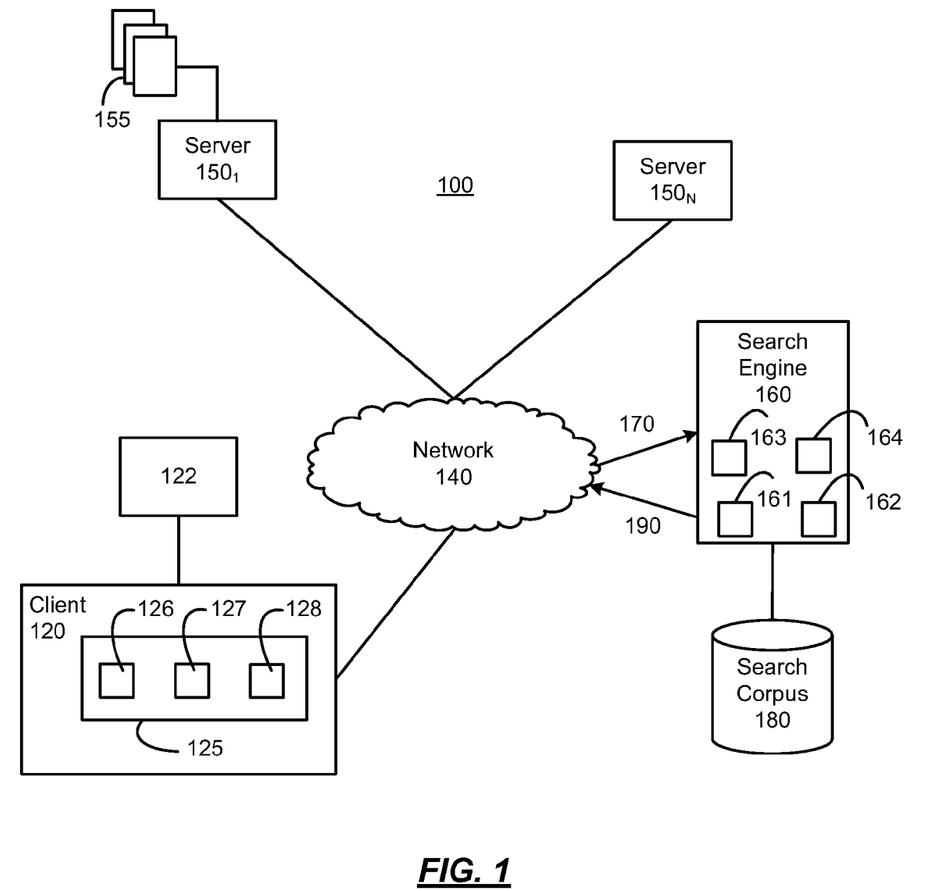
FIG. 1 illustrates an exemplary network environment.

FIG. 1 illustrates an exemplary network environment 100. In the network 100, a client 120 can may communicate through a network 140 (e.g., Internet, WAN, LAN, 3G, or other communication network), with a plurality of servers $150_1$ to $150_N$. The client 120 may communicate with a search engine 160. The client 120 may by configured to communicate with any of the servers $150_1$ to $150_N$ and the search engine 160, to access, receive, retrieve and display media content and other information such as web pages 155 and web sites.

In some implementations, the client 120 may include a desktop personal computer, workstation, laptop, PDA, cell phone, or any WAP-enabled device or any other computing device capable of interfacing directly or indirectly with the network 140. The client 120 may run an HTTP client, e.g., a browsing program, such as MICROSOFT INTERNET EXPLORER or other browser, or a WAP-enabled browser in the case of a cell phone, PDA or other wireless device, or the like, allowing a user of the client 120 to access, process and view information and pages available to it from the servers $150_1$ to $150_N$.

The client 120 may also include one or more user interface devices 122, such as a keyboard, a mouse, touch-screen, pen or the like, for interacting with a graphical user interface (GUI) provided by the browser on a display (e.g., monitor screen, LCD display, etc.), in conjunction with pages, forms and other information provided by the servers $150_1$ to $150_N$ or other servers. Implementations described herein are suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to an implementation, a client application 125 executing on the client 120 may include instructions for controlling the client 120 and its components to communicate with the servers $150_1$ to $150_N$ and the search engine 160 and to process and display data content received therefrom. Additionally, the client application 125 may include various software modules for processing data and media content. For example, the client application 125 may include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on the client 120. Further, the interface module 127 may include a browser, such as a default browser configured on the client 120 or a different browser.

According to an implementation, the search engine 160 is configured to provide search result data and media content to the client 120, and the servers $150_1$ to $150_N$ are configured to provide data and media content such as web pages to the client 120, for example, in response to links selected in search result pages provided by the search engine 160. The search engine 160 may reference various collection technologies for collecting information from the World Wide Web and for populating one or more indexes with, for example, pages, links to pages, etc. Such collection technologies include automatic web crawlers, spiders, etc., as well as manual or semi-automatic classification algorithms and interfaces for classifying and ranking web pages within an hierarchical structure. In certain aspects, the search engine 160 may also be configured having search-related algorithms within a list gathering engine 161 that gathers and maintains the lists, a comparison engine 162 that determines a representation of each list and compares lists to each other, a weighting engine 163 that determines weights of lists and elements within lists, and a ranking engine 164 that determines nearest neighbors to a query element from the lists.

In an implementation, the search engine 160 may be configured to provide data responsive to a search query 170 received from the client 120, via the search module 126. The servers 150$_1$ to 150$_N$ and 160 may be part of a single organization, e.g., a distributed server system such as that provided to users by search provider, or they may be part of disparate organizations. The servers 150$_1$ to 150$_N$ and the search engine 160 each may include at least one server and an associated database system, and may include multiple servers and associated database systems, and although shown as a single block, may be geographically distributed.

According to an implementation, the search engine 160 may include algorithms that provide search results 190 to users in response to the search query 170 received from the client 120. The search engine 160 may be configured to increase the relevance search queries received from client 120 by mining lists for similar entities to support related searches, as discussed in detail below. The search query 170 may be transmitted to the search engine 160 to initiate an Internet search (e.g., a web search). The search engine 160 locates content matching the search query 170 from a search corpus 180. The search corpus 180 represents content that is accessible via the World Wide Web, the Internet, intranets, local networks, and wide area networks.

The search engine 160 may retrieve content from the search corpus 180 that matches search the query 170 and transmit the matching content (i.e., search results 190) to the client 120 in the form of a web page to be displayed in the user interface module 127. In some implementations, the most relevant search results are displayed to a user in the user interface module 127.

Figure 2:
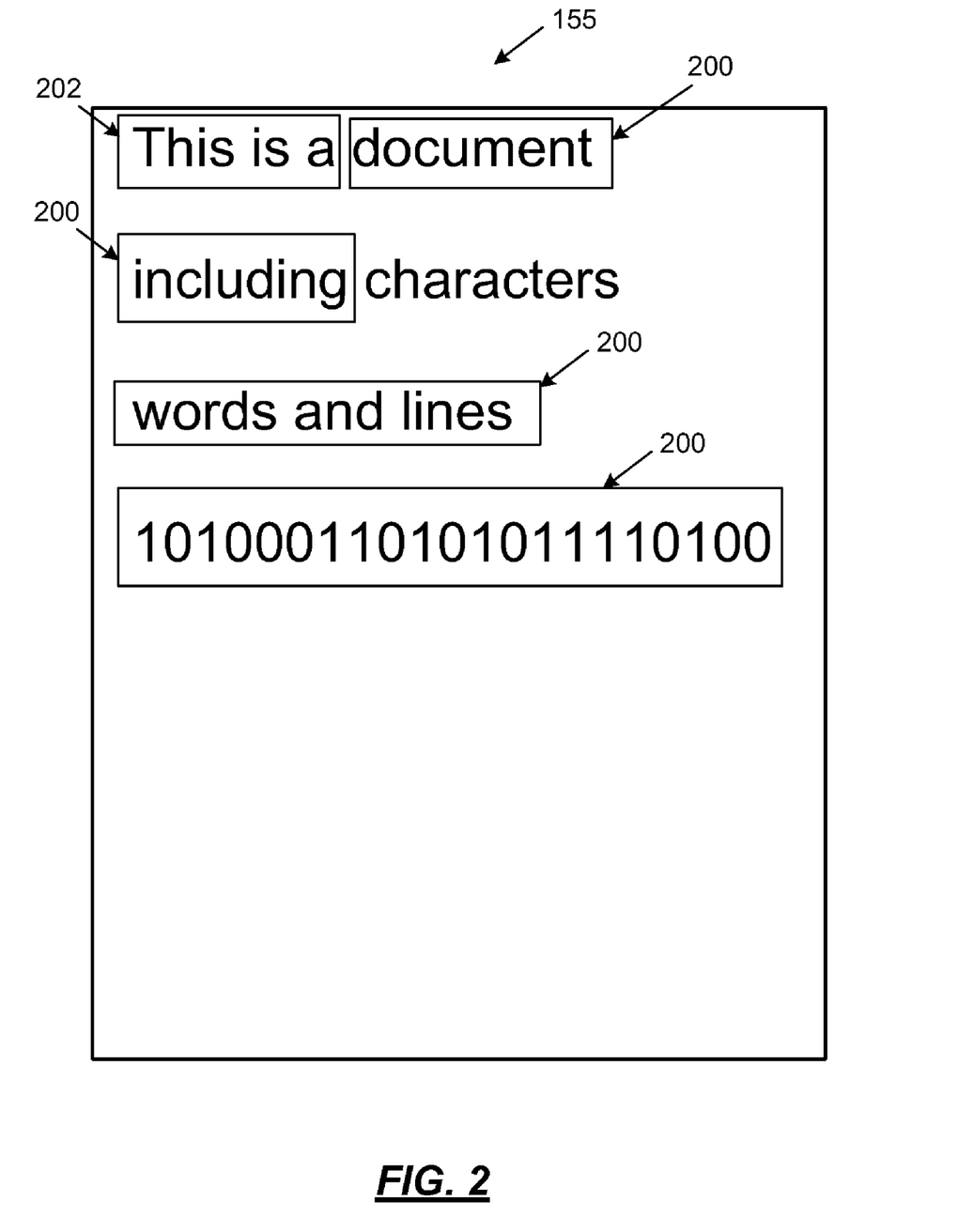
FIG. 2 shows a document parsed into a sequence of tokens and overlapping shingles.

As shown in FIG. 2, any data object, for example, a web page 155 may be viewed as a linear sequence of tokens 200. The tokens 200 may be arbitrary document features, for example, characters, words, or lines. It should be understood that in multimedia documents the tokens 200 are not necessarily human readable. Tokens may represent parts of graphic images, videos, audio, or for that matter, any digitally encoded data that may be decomposed into a canonical sequence of tokens.

The tokens may be grouped into overlapping fixed size sequences of k contiguous tokens called shingles 202. For example, for k=3, {This, is, a} is a shingle of the web page 155, as is {is, a, document}. The tokens 200 of a particular document may be grouped into shingles 202 in many different ways, but for any shingling, the number of tokens in any particular shingle should be the same. The general method may be applied to any data object from which discernable features can be extracted and stored as a canonical sequence or set.

In an implementation, each web page 155 to be compared for resemblance is parsed to produce a canonical sequence of tokens 200. In the specific case of web pages 155, canonical may mean that any formatting, case, and other minor feature differences, such as HTML commands, spacing, punctuation, etc., are ignored. The tokens 200 may be grouped into shingles 202, where the "k-shingling" of a web page 155 is the identification of a multi-set of all shingles of size k contained in the document. This multi set is denoted as S(D, k).

The Jaccard similarity coefficient is a measure used for comparing the similarity of sample sets. The Jaccard similarity coefficient is defined as the size of the intersection divided by the size of the union of the sample sets. In other words, the fraction of elements that are common to both sets approximates the similarity between the two sets. In the scenario when a document (such as a web page) is represented as a set of words, this measure is useful for determining similarity between documents. Specifically, it is useful for determining near-duplicates of web pages. Accordingly, the resemblance R of two documents A and B according to the Jaccard similarity coefficient may be defined as the ratio:

$$\|S(A,k) \cap S(B,k)/|S(A,k) \cup S(B,k)\|$$

Thus, two documents will have a high resemblance when the documents have many common shingles. The resemblance may be expressed as some number in the interval 0 to 1, and for any shingling, $R_k(A, A)=1$. In other words, document A always resembles itself 100%. A strong resemblance, that is, close to 1, will capture the notion of two documents being "roughly" the same.

When document A resembles document B by 100% for a shingle size of 1, this may mean that B is some arbitrary permutation of A. For larger sized shingles, this is still true, but now fewer permutations are possible. For example, if A={a, b, a, c, a} and B={a, c, a, b, a}, then A resembles B 100% for a size of two. Increasing the size of shingles makes the resemblance checking algorithm more sensitive to permutation changes, but also more sensitive to insertion and deletion changes.

A "sketch" which provides an estimate of a measurement of the resemblance distance between any two documents may be produced. First, a unique identification g(w) is assigned to each distinct shingle w using fingerprinting. Then, a random permutation of the set of all possible fingerprints is computed to produce a plurality of random images of the unique identifications. The permutation makes it possible to compute numbers $\delta(g(w))$ for the shingles S(A, k) in each document. A predetermined number s of the smallest elements of $\delta$ (S(A, k)) is selected and the smallest s elements are stored as a list sorted in order to create the sketch of the document. Given the sketches s(A) and s(B) of two documents, their resemblance may be determined by the Jaccard similarity coefficient.

In some implementations, it may not be necessary to determine the precise resemblance, however, only that the resemblance is above a certain threshold, such as a predetermined percentage like 97% or 99% for example. This "filtering" may provide sharper bounds on errors of both types, i.e., false positives (claiming that two documents resemble, when they do not) and false negatives (claiming that two documents do not resemble, when they do).

According to an implementation, a list of entities that group entities according to some criterion may be mined for similar entities. Entities may occur in different lists and often may be associated with different members in each list. Mining such lists for similar entities supports related searches, list completion in document processing, and other applications.

Figure 3:
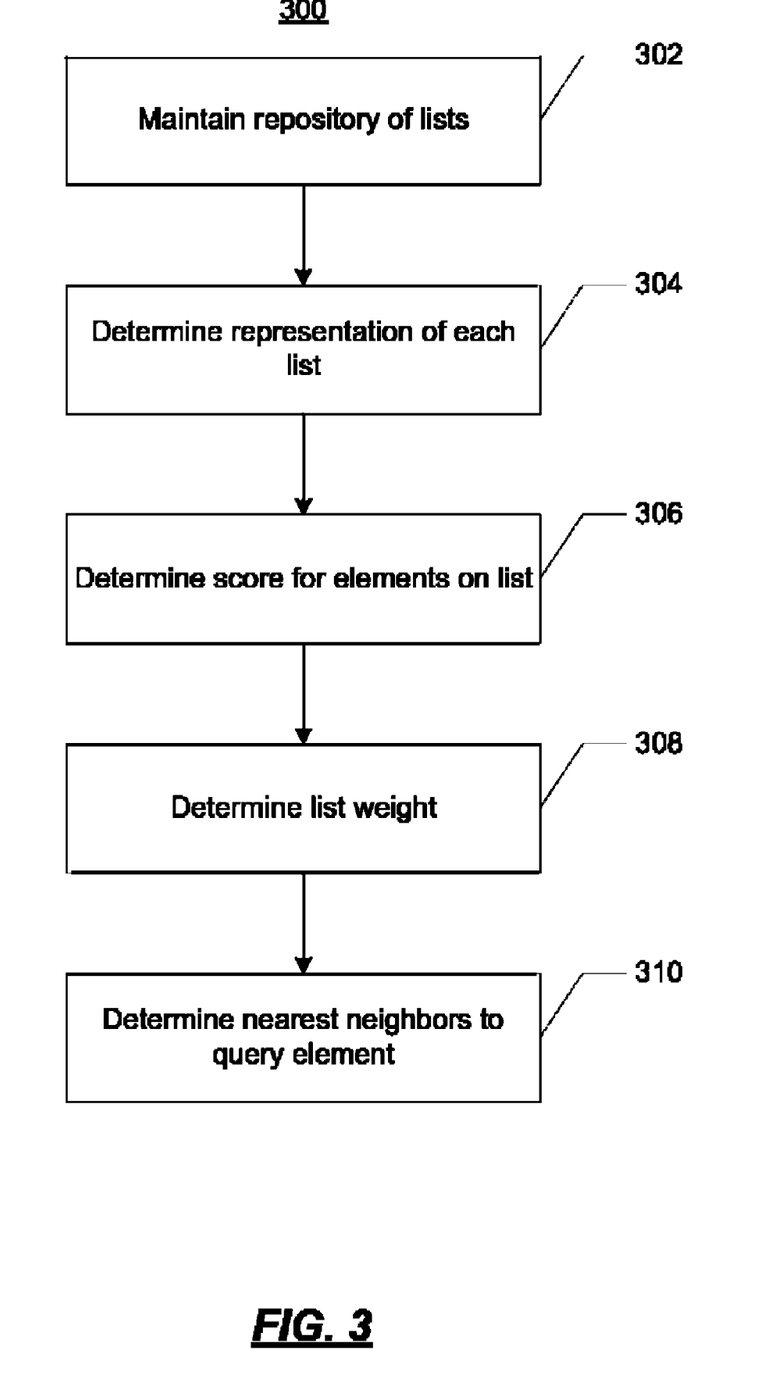
FIG. 3 is an operational flow of an implementation of a process to determine similar entities from lists.

FIG. 3 is an operational flow 300 of an implementation of a process to determine similar entities responsive to a query from a corpus of lists. At stage 302, a repository of lists is maintained. Lists may be gathered using a mechanism such as high static rank, and the lists may be stored in the search corpus 180. In some implementations, an online real-time representation of the lists may be provided. At stage 304, a representation of each list is determined. The representation may provide for a comparison between any two lists and also support efficient membership checks.

Many well known techniques may be used to determine whether documents are near-duplicates, and many of these techniques use randomness. Min-hashing is a technique for sampling an element from a set of elements which is uniformly random and consistent. As noted above, the similarity between two elements may be defined as the overlap between their item sets, as given by the Jaccard similarity coefficient. In techniques that use min-hashing, each document may be mapped to an arbitrarily long string of 0s and 1s. The largest number is used as the result to a query. If there is a tie, more bits may be evaluated.

The comparison may be performed using sketches, as described above. The sketch of a list may be computed by hashing each element into a bitvector of size m and then sampling log n+c bits from this bitvector. Here n is the number of elements in the list. In some implementations, to minimize of the number of distinct lengths a sketch can take on, the size of a sketch is rounded up to the nearest power of two. In some implementations, a bloom filter may be used to determine membership checks by treating the bloom filter as the sketch of the list. The number of hash functions and the length of the filter should be same to compare two filters.

At stage 306, a score for an element in a list is determined. This score represents the validity of an item in the corpus of lists. Thus, a spurious element may receive a very low score, while a valid element would receive a higher score.

At stage 308, a list weight is determined using the constituent element weights. Stage 308 may implement the following model to compute the weight of an element:

A. The weight of an element in a similar lists is greater than the weight of the same element in dissimilar lists.

B. An element in less number of similar lists has greater weight than when it occurs in a lot of similar lists C. The weight of an element in a short list is greater than the weight of the same element in a longer list.

D. If the likelihood of an element A being similar to other good elements is larger than the likelihood for element B, then the weight of A is greater than the weight of B.

According to implementations based on the above, a weight of an element i, $w_i$, may be computed as $$w_i = \log\left(\frac{N}{1+f_i}\right) \sum_{l \in L_i} \frac{S_i(l)}{\log(|g - \text{length}(l)|)}$$

where $L_i$ is the set of lists containing element i
$f_i$ is equal to $|L_i|$,
g is the average length of a list, and
N is the total number of lists.

Next, the weight of a list j may be determined as:

$$lw_j = \frac{1}{\text{length}(j)} \sum_{i \in j} w_i$$

At stage 310, the element and list weight is used to determine the nearest neighbors of a given query element. For an element i, $L_i$ may be determined, and the set sorted based on the list-weight, lw. In some implementations, the top 200 lists from this sorted set may be selected, and then a weight for each element in this set of lists is determined by:

$$\hat{w}_{ki} = \frac{lw_i}{\text{argmax}_m lw_m} \frac{w_{ki}}{\sum_j w_{ji}}$$

Thus, elements in the top p lists may be sorted according to their weights, and the top k elements may be selected and returned as the nearest neighbors of element i.

In some implementations, the lists may be mapped to the items they contain, and in turn all items are mapped to the lists they contain. Lists and items may be assigned a 64-bit unique ID number, upon which lookups of the list sketches/bloom filters, list/item computed weights, and list/item link sets are keyed.

Figure 4:
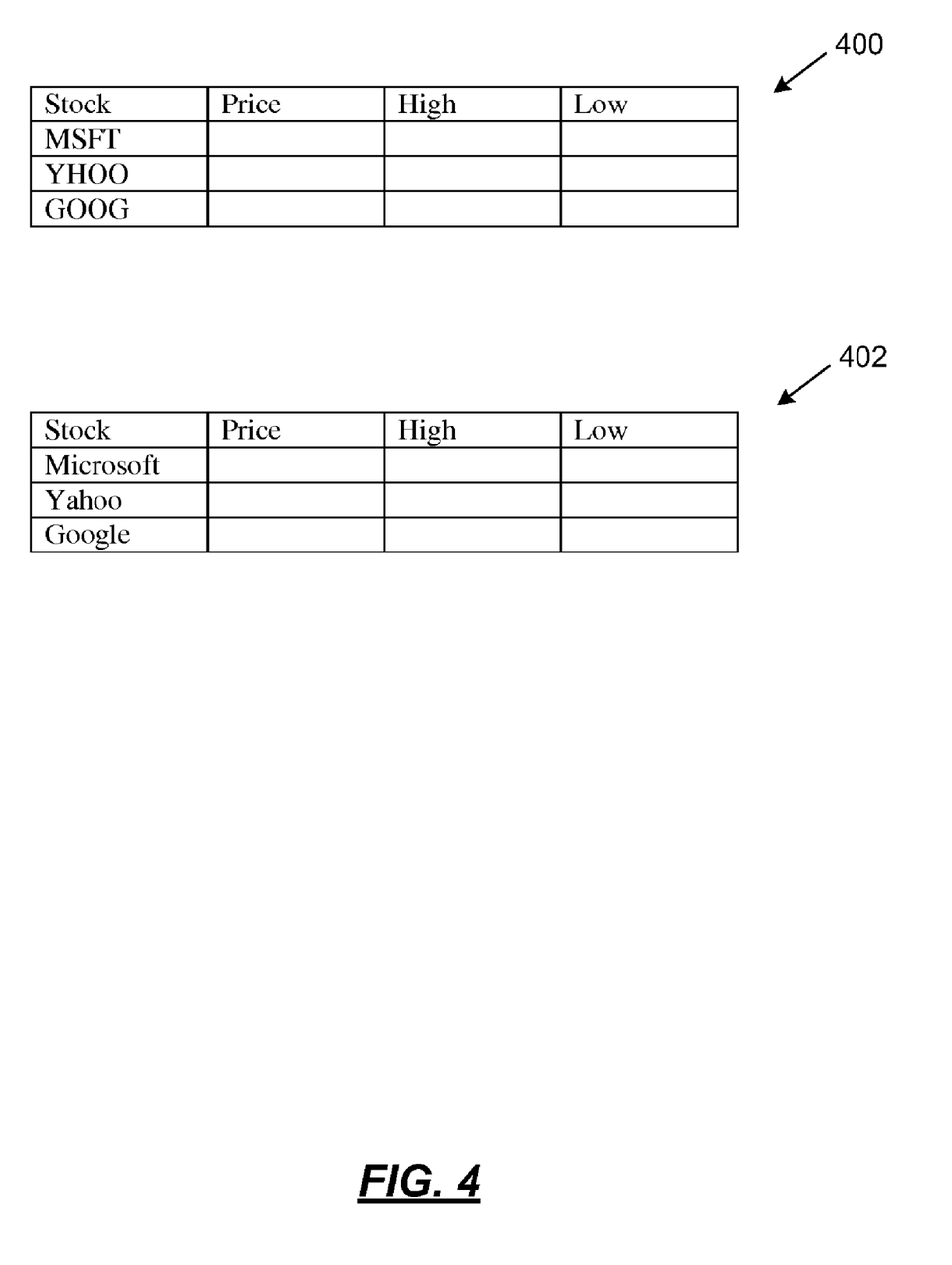
FIG. 4 illustrates exemplary HTML tables.

In some implementations, the above may be used to perform sketch-based comparisons of HTML tables. This may be performed where tables of the same type, i.e., schema, are compared. Where only the information contained in a table is responsive to a query, then the tables need not be of the same type. FIG. 4 illustrates exemplary HTML tables containing stock quotes. Table 400 shows the ticker symbol in column 1, whereas table 402 shows the full company name. The column sketch for table 400 and table 402 may be determined (e.g., 100111 and 101001) and the similarity of the sketches compared.

Thus, in some implementations, a row sketch may be determined, where in other implementations, a column sketch is determined. The row sketch may be determined as noted above, where each row is analyzed as a list of column values. As such, an HTML table may be characterized as a list of sketches. A similar list of entities (e.g., rows) may be determined for a given row. Further, similar entities may be queried even when the input row does not contain values of all the columns. Similarly, rows may be query extracted that contain elements in a given column. In this instance, the input query (e.g., a column) may be encoded using a sketch.

Exemplary Computing Arrangement

Figure 5:
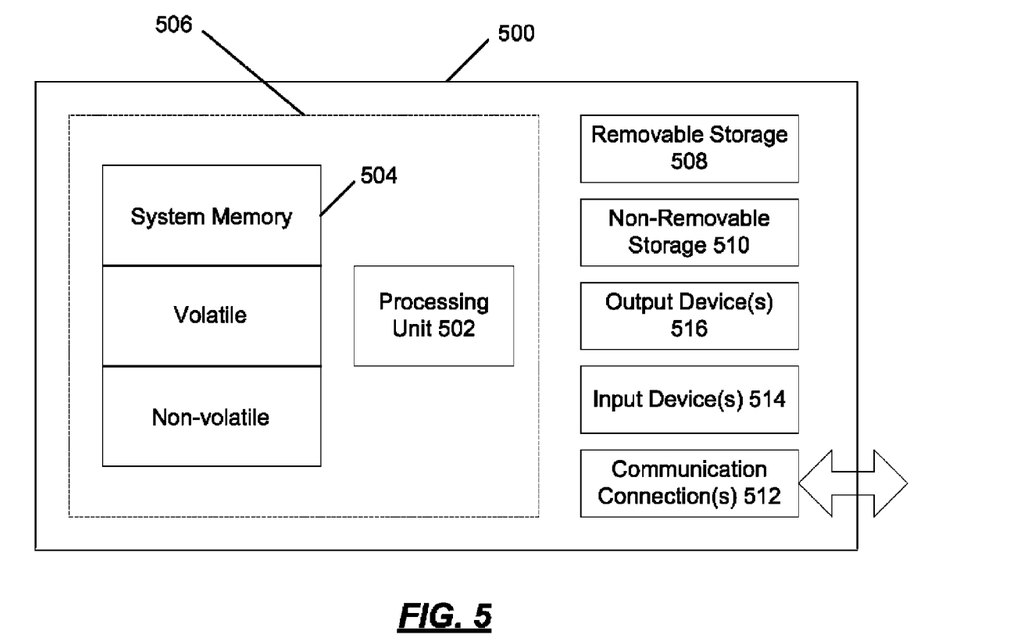
FIG. 5 shows an exemplary computing environment.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining similar entities to a query element from a corpus of lists, comprising:

storing a corpus of lists at a computing device configured to provide data responsive to search queries;

determining a representation for each list in the corpus;

determining similarity between lists in the corpus that contain common elements by comparing representations of the lists in the corpus;

determining a score for each element in each list in the corpus that represents validity of each element in the corpus;

determining, for each list in the corpus, an element weight for each element occurring in each list in the corpus, wherein:

the element weight of each common element that occurs in different lists in the corpus is based on the similarity between the different lists in the corpus that contain the common element, and the element weight of each common element that occurs in different lists is greater in similar lists in the corpus than the element weight of the same common element in dissimilar lists in the corpus;

determining a list weight for each list in the corpus using constituent element weights of the elements within each list;

receiving a search query that includes the query element at the computing device;

determining nearest neighbors of the query element by:

selecting a predetermined number of top lists from a set of lists that contain the query element based on the list weight for each list in the set of lists that contain the query element, determining an element weight for each of the elements in the top lists, and selecting a predetermined number of top elements from the elements in the top lists as the nearest neighbors of the query element based on the element weight for each of the elements in the top lists; and providing data responsive to the search query comprising the nearest neighbors of the query element.

2. The method of claim 1, wherein the representation for each list in the corpus comprises a sketch computed by hashing elements of each list into a bitvector and sampling a predetermined number of bits from the bitvector, the method further comprising:

comparing a first list to a second list using the sketch of the first list and the sketch of the second list.

3. The method of claim 2, further comprising:

performing membership checks using a bloom filter having a length equal to a number of hash functions used to determine the sketch.

4. The method of claim 1, wherein the element weight for each common element that occurs in the different lists is based further on:

number of lists in the corpus that contain the common element;

an average length of the lists that contain the common element; and a total number of lists in the corpus.

5. The method of claim 4, further comprising:

determining an average weight of the lists that contain the common element.

6. The method of claim 4, further comprising:

assigning a greater element weight to each common element that occurs in similar lists when the common element appears in a smaller number of similar lists than when the common element appears in a larger number of similar lists.

7. The method of claim 4, further comprising:
assigning a greater element weight to each common element that occurs in the different lists when the common element appears in a short list than when the element appears in a longer list.

8. The method of claim 1, wherein determining nearest neighbors of the query element further comprises:
sorting the set of lists that contain the query element based on the list weight of for each list in the set of lists that contain the query element.

9. The method of claim 8, further comprising:
selecting the predetermined number of top lists from the sorted set of lists that contain the query element;
sorting the elements in the top lists based on the element weight for each of the elements in the top lists to determine a sorted list of elements; and
selecting the predetermined number of top elements from the sorted list of elements as the nearest neighbors of the query element.

10. The method of claim 1, wherein the representations of the lists in the corpus comprise sketches of HTML tables.

11. A system of determining nearest neighbors of a query element, the system including a processing unit executing computer-executable program modules located in computer storage media comprising:
a search engine that provides data responsive to search queries;
a list gathering engine that stores a corpus of lists;
a comparison engine that determines a representation of each list in the corpus and compares representations of lists in the corpus to determine similarity between the lists in the corpus that contain common elements;
a weighting engine that determines, for each list in the corpus, a score for each element in each list in the corpus that represents validity of each element in the corpus, an element weight for each element occurring in each list in the corpus, and a list weight for each list in the corpus using constituent element weights, wherein:
the element weight of each common element that occurs in different lists in the corpus is based on the similarity between the different lists in the corpus that contain the common element, and
the element weight of each common element that occurs in different lists is greater in similar lists in the corpus than the element weight of the same common element in dissimilar lists in the corpus; and
a ranking engine that, in response to the search engine receiving a search query comprising the query element, determines the nearest neighbors to the query element by:
selecting a predetermined number of top lists from a set of lists that contain the query element based on the list weight for each list in the set of lists that contain the query element,
determining an element weight for each of the elements in the top lists, and
selecting a predetermined number of top elements from the elements in the top lists that contain the query element based on the element weight for each of the elements in the top lists.

12. The system of claim 11, wherein the comparison engine:
determines a sketch of each list in the corpus, and
determines membership checks using a bloom filter having a length equal to a number of hash functions used to determine the sketch.

13. The system of claim 11, wherein the weighting engine determines the element weight for each common element that occurs in the different lists based on number of lists in the corpus that contain the common element, total number of lists in the corpus, and an average length of the lists that contain the common element.

14. The system of claim 13, wherein the weighting engine determines an average weight of lists that contain the common element.

15. The system of claim 11, wherein the ranking engine sorts the set of lists that contain the query element based on the list weight for each list in the set of lists that contain the query element.

16. The system of claim 15, wherein the ranking engine:
selects the predetermined number of top lists from the sorted set of lists that contain the query element;
sorts the elements in the top lists based on the element weight for each of the elements in the top lists to determine a sorted list of elements; and
selects the predetermined number of top elements from the sorted list of elements as the nearest neighbors of the query element.

17. A computer-readable storage medium comprising computer-executable program instructions stored thereon that, when executed, cause a computing device to:
store a corpus of lists at the computing device, wherein the computing device is configured to provide data responsive to search queries;
determine a representation for each list in the corpus;
determine similarity between lists in the corpus that contain common elements by comparing representations of the lists in the corpus;
determine a score for each element in each list in the corpus that represents validity of each element in the corpus;
determine, for each list in the corpus, an element weight for each element occurring in each list in the corpus, wherein:
the element weight of each common element that occurs in different lists in the corpus is based on the similarity between the different lists in the corpus that contain the common element, and
each common element is assigned a greater weight when the common element occurs in similar lists in the corpus than when the common element occurs in dissimilar lists in the corpus;
determine a list weight for each list in the corpus using constituent element weights of the elements within each list;
receive a search query that includes the query element at the computing device;
determine nearest neighbors of the query element by:
selecting a predetermined number of top lists from a set of lists that contain the query element based on the list weight for each list in the set of lists that contain the query element,
determining an element weight for each of the elements in the top lists, and
selecting a predetermined number of top elements from the elements in the top lists as the nearest neighbors of the query element based on the element weight for each of the elements in the top lists; and
provide data responsive to the search query comprising the nearest neighbors of the query element.

18. The computer-readable storage medium of claim 17 wherein the representation for each list in the corpus comprises a sketch computed by hashing elements of each list into a bitvector and sampling a predetermined number of bits from the bitvector.

19. The computer-readable storage medium of claim 17 further comprising computer-executable program instructions for causing the computing device to:
sort the set of lists that contain the query element based on the list weight for each list in the set of lists that contain the query element.

20. The computer-readable storage medium of claim 19 further comprising computer-executable program instructions for causing the computing device to:

select the predetermined number of top lists from the sorted set of lists that contain the query element;

sort the elements in the top lists based on the element weight for each of the elements in the top lists to determine a sorted list of elements; and select the predetermined number of top elements from the sorted list of elements as the nearest neighbors of the query element.

* * * * *